United States Patent [19]
Meek

[11] Patent Number: 5,597,195
[45] Date of Patent: Jan. 28, 1997

[54] RAMPABLE TAILGATE

[76] Inventor: Keith C. Meek, 5502 56th St., Lubbock, Tex. 79414

[21] Appl. No.: 458,739

[22] Filed: Jun. 2, 1995

[51] Int. Cl.⁶ .................................................. B62D 33/03
[52] U.S. Cl. .............................. 296/61; 296/57.1; 414/537
[58] Field of Search ................................ 296/57.1, 61, 50, 296/62; 280/901; 414/537

[56] References Cited

U.S. PATENT DOCUMENTS

| | | | |
|---|---|---|---|
| 3,510,015 | 5/1970 | Roshaven . | |
| 3,642,156 | 2/1972 | Stenson | 296/61 |
| 3,756,440 | 9/1973 | Raap et al. | 296/61 |
| 3,976,209 | 8/1976 | Burton | 296/61 |
| 4,003,483 | 1/1977 | Fulton . | |
| 4,685,695 | 8/1987 | LeVee | 280/441.2 |
| 4,750,777 | 6/1988 | Brammer | 296/50 |
| 4,944,546 | 7/1990 | Keller | 296/61 |
| 5,145,310 | 9/1992 | Calzone | 414/537 |
| 5,156,432 | 10/1992 | McCleary . | |
| 5,211,437 | 5/1993 | Gerulf . | |
| 5,273,335 | 12/1993 | Belnap et al. . | |
| 5,287,579 | 2/1994 | Estevez | 296/61 |
| 5,312,148 | 5/1994 | Morgan | 296/61 |

Primary Examiner—Gary C. Hoge
Attorney, Agent, or Firm—Novak Druce Reynolds Burt

[57] ABSTRACT

The present invention is a tailgate comprising a plurality of foldable members configured to nest one with the others in an upright closed position and to extend longitudinally from the rear of the truck when in an extended position. A notched section is positioned at a top side of the plurality of foldable members when in an upright position for accommodating a goose neck trailer.

5 Claims, 3 Drawing Sheets

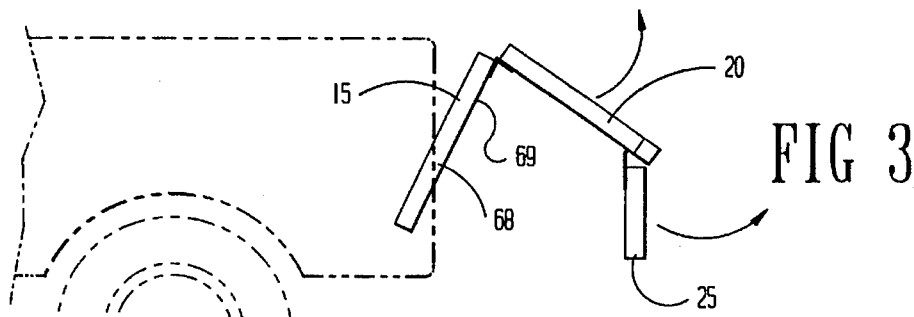
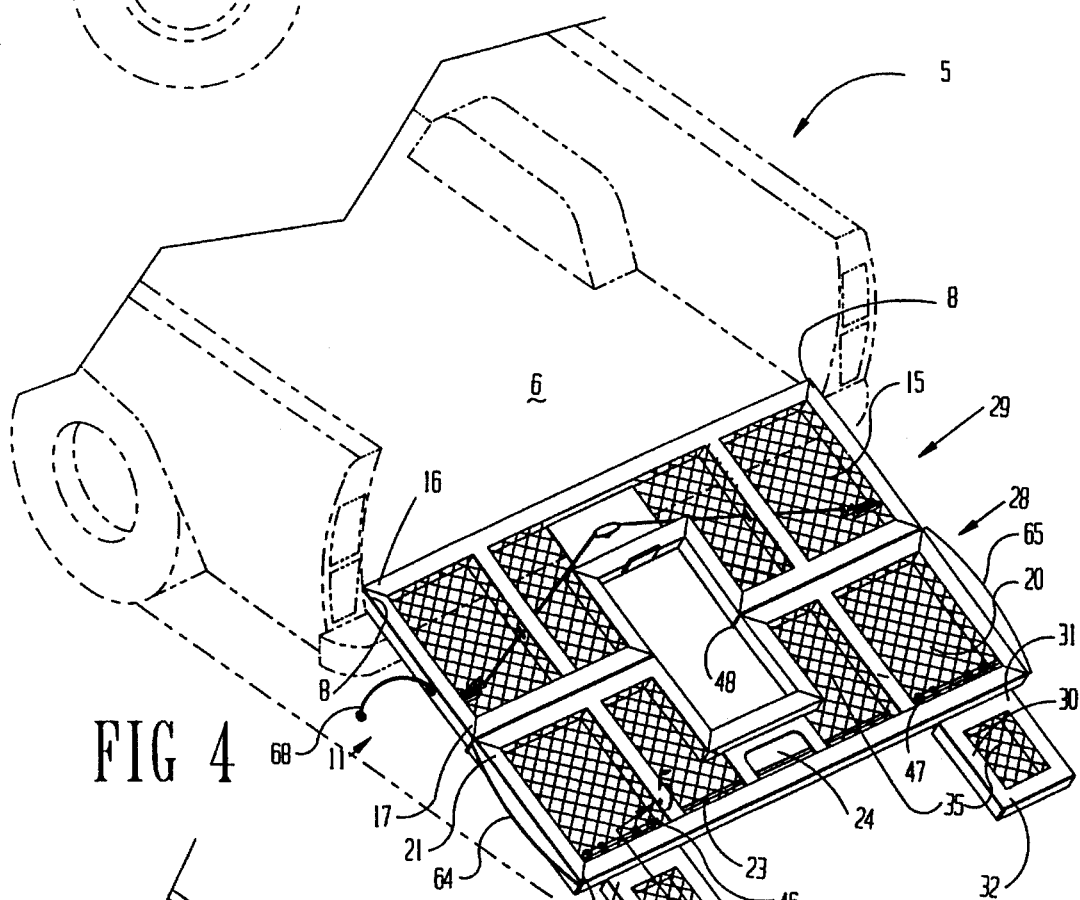
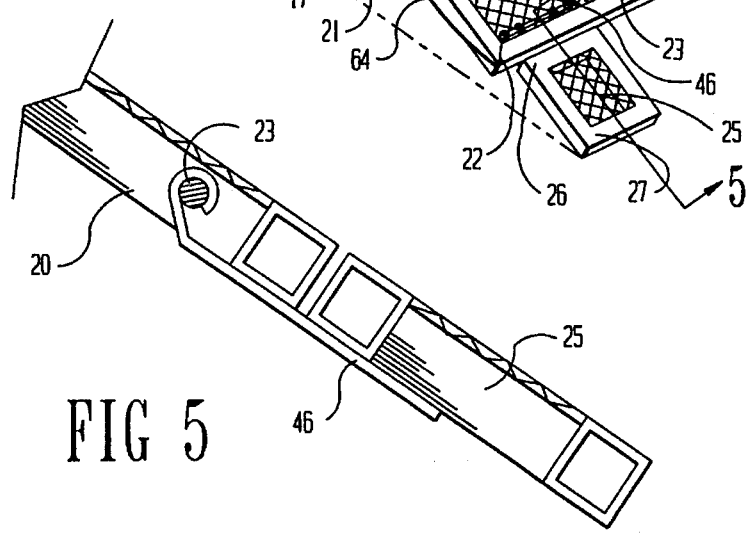

RAMPABLE TAILGATE

BACKGROUND OF THE INVENTION

1) Field of the Invention

The present invention relates generally to truck tailgates, and more particularly to truck tailgates that can also be converted into a ramp.

2) Description of the Related Art

Truck tailgates that can be converted into ramps for loading items into the bed of a truck are well known in the art of truck tailgates. Several patents have issued concerning rampable tailgates. U.S. Pat. No. 5,156,432 to McCleary for Folding Gate Ramp For Pickup Trucks includes disclosure of a tailgate that can be used as a ramp by unfolding two planar members that are connected pivotally together. U.S. Pat. No. 5,211,437 to Gerulf for Combination Tailgate and Ramp Assembly includes disclosure of a tailgate that can be converted into a ramp by the following steps. The first step is lowering the tailgate which is comprised of two planar members. The second step is unlatching the two planar members which lie one on top of the other. The third step is removing bolts from the fastener brackets which disconnects the planar members. The fourth step is picking up and rotating one planar member ninety degrees so that the member serves as a portion of the ramp. The fifth step is rotating the other planar member ninety degrees, sliding the second planar member away from the first planar member, and then flipping the second planar member over to complete the ramp. U.S. Pat. No. 5,273,335 to Belnap et al. for Truck Ramp/Tailgate includes disclosure of a foldable tailgate comprising of four planar members. Two exterior planar members unfold to form a portion of the ramp and also serve to house two interior planar members. By pulling one of the exterior planar members away from the rear of the truck, the interior planar members are removed from their housing and extended to form a ramp from the rear of the truck.

Examining these devices however reveals several shortcomings. One shortcoming, concerning designs in which the rampable tailgate consists of two foldable members, is the difficulty one would have manually loading items into the bed of the truck. A two-fold ramp is rather short and creates a steep incline. Thus more force is required to roll items into the bed of the truck.

Designs having the tailgate comprised of two planar members, which must be disconnected and rotated to form a ramp, require several steps to convert the tailgate into the ramp. Furthermore, converting the tailgate into a ramp requires using bolts that are detachable from the tailgate and are stored separate from the ramp. If the bolts are misplaced while using the tailgate as a ramp, the planar pieces cannot be reattached to form the tailgate.

Another design showing a rampable tailgate comprising of four planar members, where two planar members are housed within two exterior planar members, has the disadvantage that the planar members may become rusted, scratched, and/or dented over time. This damage will impede separating the exterior members when converting the tailgate into the ramp. The rust, scratches and dents will increase friction between the interior and exterior members, thereby making it difficult to extend the ramp by pulling one of the exterior members over the interior members.

One shortcoming common to all these tailgates is that in attaching a goose neck trailer to the truck, the tailgate must be lowered. No opening in the tailgate exists so that the trailer can be attached to the truck without having to lower the tailgate.

In summary, several problems become apparent upon examining current rampable tailgates. One problem is that having a rampable tailgate comprising of two foldable planar members increases the angle of the ramp with the rear of the truck. Another problem occurs with tailgates that require extra steps and have detachable parts. The extra steps require more time and the detachable parts maybe lost when converting the tailgate into a ramp. Still another problem is that some tailgates require that parts of the ramps be exposed by sliding exterior members over interior members. As these ramps are used over time; rust, scratches and dents will make converting these tailgates into ramps difficult. An additional problem is that all of these devices require that the tailgate be lowered to attach a goose neck trailer to the truck.

SUMMARY OF THE INVENTION

The current invention is a rampable tailgate that is comprised of four planar frame members that unfold to form a ramp. The first and second frame members unfold to form a portion of the ramp, while the third and fourth frame members extend from the second frame member to complete the ramp. The invention is designed to maximize the length and minimize the angle of incline from the truck bed to the ground. The tailgate is a unitary piece. Thus no parts are detached and separated from the tailgate when the tailgate is converted into a ramp. In addition, since the members of the tailgate are unfolded to form the ramp; rust, scratches, and dents on the outer surfaces of the planar members should not significantly hinder unfolding the tailgate to form the ramp. Additionally, all four planar members form an opening when positioned as a tailgate so that a goose neck trailer can be connected to the truck without having to lower the tailgate.

It is an object of the current invention to provide a rampable tailgate that has four planar members to increase the length of the ramp and minimize the angle of the ramp with the ground.

It is a further object of the present invention to provide a rampable tailgate that is foldable so that the tailgate will be easy to operate if its surfaces are dented or scratched.

It is an additional object of the present invention to provide a rampable tailgate with a notch on its top surface for accommodating a goose neck trailer.

In accordance with these aims, one embodiment of the present invention is a rampable tailgate for use with a truck having a rear end with spaced apart sidewalls and a bottom wall. The rampable tailgate comprises first, second, and third generally planar frame members nestable together in a common plane. The first frame member has first and second sides and is pivotally coupled to the truck at a location proximate to the rear of the truck. The first frame member can be pivoted between an upstanding position and a rearwardly extending position. The second generally planar frame member is foldably nestable with the first frame member and includes first and second sides. The first side of the second frame member is coupled to the second side of the first frame member thereby enabling folding of the second frame member with the first frame member and folding of the second frame member to a position generally co-planar with the first frame member. The third generally planar frame member is foldably nestable with the second frame member and includes first and second sides. The second side of the second frame member and the first side of the third frame member is coupled to enable folding of the third frame member with the second frame member, and folding of the third frame member to a position generally co-planar with the second frame member.

Another embodiment of the present invention is a tailgate for use with a truck bed having a rear end with spaced apart sidewalls and a bottom wall, where the tailgate extends to a height less than the height of the sides of the truck bed.

An additional embodiment is a tailgate comprising a plurality of foldable members configured to nest one with the others in an upright closed position and to extend longitudinally from the rear of the truck when in an extended position. A notched section is positioned at a top side of the plurality of foldable members when in an upright position for accommodating a goose neck trailer.

BRIEF DESCRIPTION OF THE DRAWINGS

FIG. 3 is a side view of one method of converting the tailgate into a ramp.

FIG. 4 is a perspective view of the rampable tailgate as a ramp.

FIG. 5 is a sectional view of one of the pair of spring hinges 46 taken along line 5—5 as shown in FIG. 4.

DETAILED DESCRIPTION OF THE INVENTION

Figure 1:
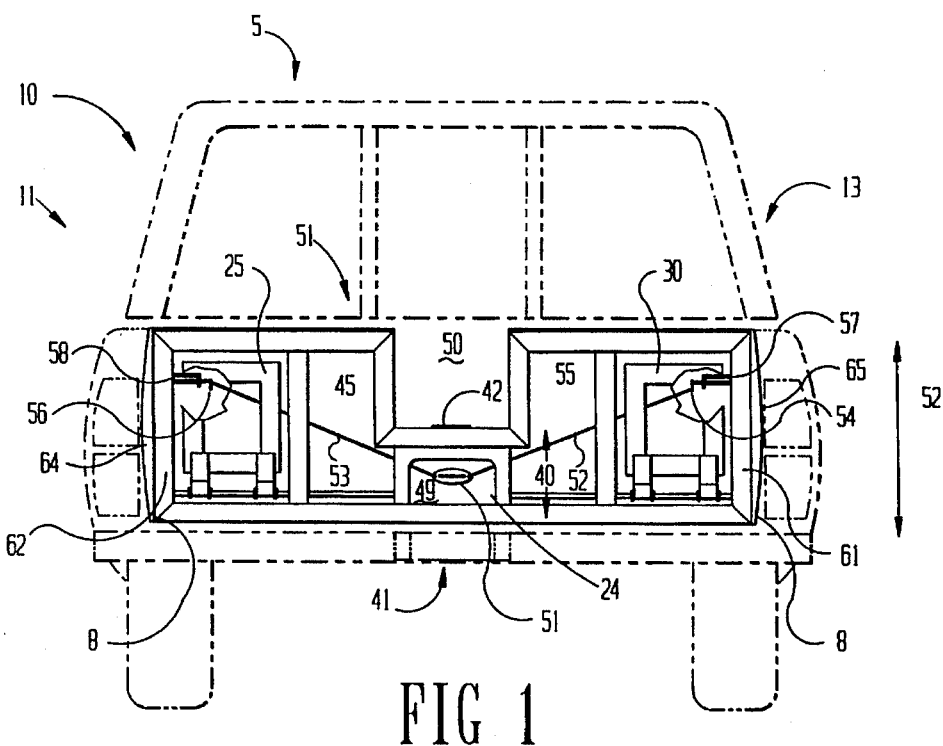
FIG. 1 is a view from the rear of the truck showing the rampable tailgate in the upright position. Partial cut-away sections in the figure have been removed from third foldable member 25 and fourth foldable member 30 to reveal pins 54 and 56 and springs 57 and 58.

One embodiment of the present invention is illustrated in FIGS. 1–7. Referring to FIG. 1, a tailgate or rampable tailgate 10 is shown which is preferably made from various sized pieces of shaped and welded steel. It should be pointed out that the rampable tailgate 10 could be manufactured from other materials such as metal rods, aluminum, angle iron, plastic or metal tubulars. Therefore, for the purpose of this description, the term "member", as used hereinafter, shall be understood to be possibly manufactured from any material suitable for construction of such a device, even though steel is presently preferred due to its strength. Several components of the tailgate 10 are disclosed as being "coupled"; that terminology is used because it is anticipated that elements may be connected together in such a way that there are other components interstitially located between the connected elements, or that the elements may connect in fixed or movable relation one to the other. To simplify the drawings, the metal mesh 35 that is shown in FIG. 4 is omitted from the other figures.

In FIG. 1, the tailgate 10 is shown in an upstanding or upright closed position 13. Referring to FIG. 4, the rampable tailgate 10 which has been converted into ramp 29 generally includes a plurality of foldable members 11. These foldable members are a first generally planar frame member or first foldable member 15, a second generally planar frame member or second foldable member 20, a third generally planar member or third foldable member 25, and a fourth generally planar frame member or fourth foldable member 30. Member 15 includes first side 16 and second side 17, member 20 includes first side 21 and second side 22, member 25 includes first side 26 and second side 27, and member 30 includes first side 31 and second side 32. While the rampable tailgate 10 is used as a tailgate as in FIG. 2, member 15, member 20, member 25 and member 30 will be held together in the same common plane 12.

Referring to FIG. 4, members 15, 20, 25, and 30 are connected as follows. First side 16 of first member 15 is pivotally connected to the rear of the truck bed 6 at location 8. Members 15 and 20 are connected by a pair of hinges 48. Second side 17 of first member 15 is connected via hinge 48 to first side 21 of second member 20. Member 20 is connected by a pair of spring hinges 46 and a second pair of spring hinges 47 to members 25 and 30 respectively. Second side 22 of second member 20 is connected to the first side 26 of the third member 25 via spring hinge 46 and to the first side 31 of fourth member 30 via spring hinge 47. FIG. 5 shows a cross-sectional view along line 5—5 in FIG. 4 of one of the pair of spring hinges 46 connecting member 20 with member 25. The second sides 27 and 32 of third member 25 and fourth member 30 respectively are in contact with the ground when tailgate 10 is converted into ramp 29.

Items, such as lawnmowers, can be loaded into truck bed 6 by rolling or pushing them along the ground onto third member 25 and fourth member 30, up the second and first members 20 and 15, and into truck bed 6. Conversely, items can be removed from the bed 6 to the ground by reversing the previous steps.

Figure 2:
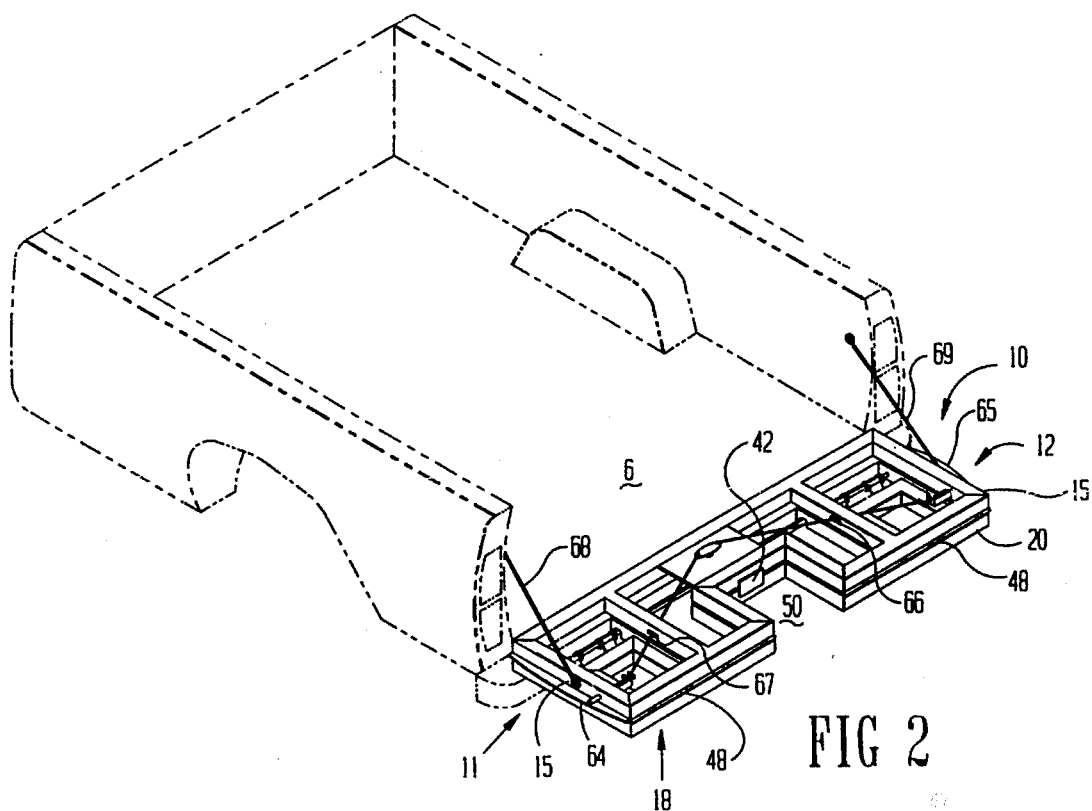
FIG. 2 is perspective view of the rampable tailgate illustrating the tailgate in an open, rearwardly extending position.

One method has three steps for converting tailgate 10 into ramp 29. The first step is to use latching mechanism 41 to lower tailgate 10. Referring to FIG. 1, mechanism 41 is comprised of handle 51, wire 52, wire 53, pin 54, pin 56, spring 57, and spring 58. A handle opening 24 in second member 20 allows access to handle 51 when tailgate 10 is in an upstanding position 13. Partial cut-away sections from members 25 and 30 are removed from the drawing in FIG. 1 to reveal wire 52 connecting handle 51 with pin 54 and wire 53 connecting handle 51 with pin 56. Wires 52 and 53 extend through holes 66 and 67 respectively in member 15 to connect with pins 54 and 56. Pin 54 and pin 56 are at least partially retained in spring 57 and spring 58. Springs 57 and 58 maintain pins 54 and 56 in the sides of truck bed 6 thereby holding tailgate 10 in an upright position 13. By turning handle 51 clockwise, wire 52 and wire 53 pull away from and withdraw pins 54 and 56 from the sides of truck bed 6. Tailgate 10 can now be lowered so that member 15 is in an open, rearwardly extending position 18 as shown by FIG. 2. For holding members 15 and 20 in a horizontal position while tailgate 10 is lowered, cables 68 and 69 are used to connect member 15 with the sides of truck bed 6 as shown by FIG. 2.

The second step is releasing latch 42 to allow pivotal movement of second member 20 with first member 15. In the preferred embodiment, latch 42 is pivotally connected to member 20. Latch 42 has a U-shaped notch that partially surrounds a knob extending from the top side of member 15. To unlatch members 15 and 20, latch 42 is rotated away from the knob extending from member 15 so that the knob will no longer be surrounded by latch 42. First member 15 and second member 20 are connected at their top edges by a pair of hinges 48, which preferably are standard piano style hinges. Prior to extending second member 20, cables 68 and 69 are disconnected from the sides of truck bed 6. By extending second member 20 upwardly and rearwardly as shown by FIG. 3, second member 20 can be pivoted to a position co-planar with first member 15 to form a portion of ramp 29.

The third step is to unfold third and fourth members 25 and 30. Third member 25 and fourth member 30 are connected to second member 20. The second side 22 of second member 20 includes an elongated cylindrical rail 23. A first pair of spring hinges 46 and a second pair of spring hinges 47 connect third member 25 and fourth member 30 respectively onto rail 23. By pulling third and fourth members 25 and 30 upwardly and rearwardly as shown by FIG. 3, members 25 and 30 can be moved into a position co-planar 28 with second member 20.

Third and fourth members 25 and 30 can be maneuvered parallel with the rear of truck 5 by sliding members 25 and 30 along spring hinges 46 and 47. Spring hinges 46 and 47 have generally semi-circular couplings which partially surround rail 23, thereby allowing members 25 and 30 to be moved to form separate ramps as shown by FIG. 4 or a single ramp for loading objects onto truck 5.

Figure 6:
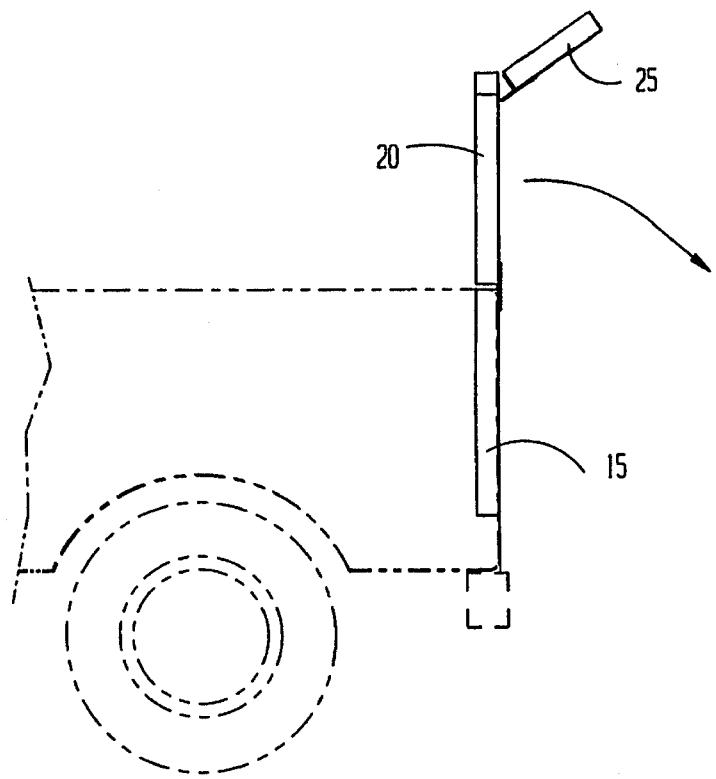
FIG. 6 is a side view of the preferred method of converting the tailgate into a ramp with the second foldable member 20 being positioned vertically above first foldable member 15.
Figure 7:
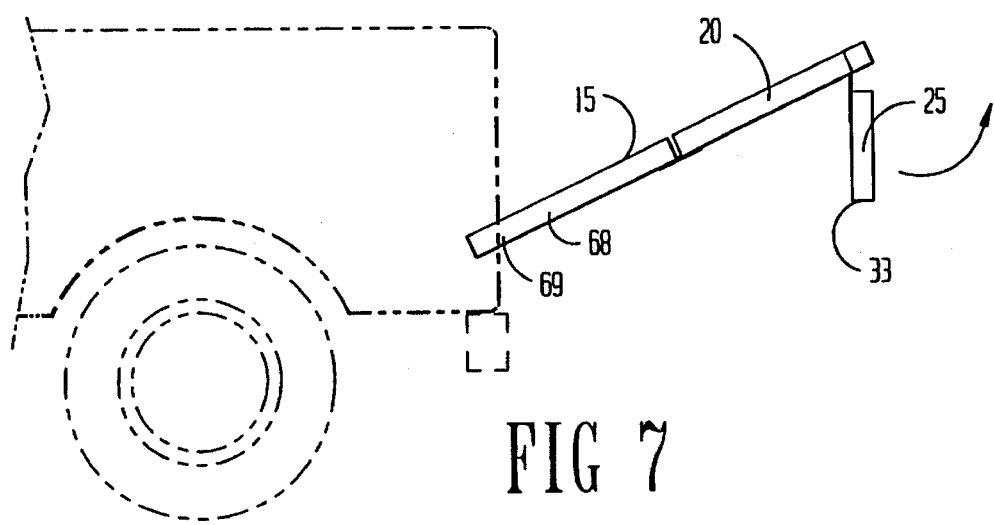
FIG. 7 is a side view of the preferred method of converting the tailgate into a ramp with both first foldable member 15 and second foldable member 20 being lowered in the same plane.

Referring to FIG. 1, FIG. 4, FIG. 6, and FIG. 7, the preferred method for converting tailgate 10 into ramp 29 is releasing latch 42 to uncouple first member 15 and second member 20. After releasing latch 42, second member 20 is positioned vertically and generally coplanar with first member 15 as illustrated by FIG. 6. After positioning second member 20, latching mechanism 41 is released so that first member 15 and second member 20 are pivotally lowered while remaining in the same general plane. Next, cables 68 and 69 are released from the sides of truck bed 6. Once cables 68 and 69 are disconnected, members 25 and 30 are pulled on their sides upward and away from member 20 to unlock spring hinges 46 and 47. Unlocking spring hinges 46 and 47 will allow members 25 and 30 to hang vertically as members 15 and 20 are pivotally lowered as shown by FIG. 7. In FIGS. 6 and 7, member 30 is behind and obscured by member 25. The bottom 33 of member 25 and the bottom of member 30 will rest on the ground thereby positioning members 15 and 20 above the ground. To complete the conversion of tailgate 10 to ramp 29, members 25 and 30 are pulled on their sides upward and away from truck bed 6 to extend ramp 29 to the position illustrated in FIG. 4.

One method of converting ramp 29 into tailgate 10 is members 25 and 30 are retracted by moving members 25 and 30 downwardly and forwardly underneath member 20. Once underneath member 20, spring hinges 46 and 47 will lock members 25 and 30 in place. End 22 of second member 20 is moved forwardly and downwardly in conjunction with moving end 17 of first member 15 forwardly and upwardly to form an arch. By continuing to move member 20 forward, ramp 29 will be converted into tailgate 10 as shown by FIG. 1 with members 15, 20, 25 and 30 in the upright position 13. Cables 68 and 69 are then reattached to first foldable member 15. By securing latch 42 and latching mechanism 41, members 15 and 20 will remain in upright position 13.

Referring to FIG. 1, FIG. 4, FIG. 6, and FIG. 7, the preferred method of converting ramp 29 into tailgate 10 is positioning first foldable member 15 and second foldable 20 substantially vertically. Members 25 and 30 can be pushed toward member 20 to lock spring hinges 46 and 47. Cables 68 and 69 are then reattached to the sides of truck bed 6. Once cables 68 and 69 are reattached, members 20 and 15 are positioned vertically as illustrated in FIG. 6. Once positioned, latching mechanism 41 is used to secure first foldable member 15. Next second foldable member 20 is pivoted downward adjacent to first foldable member 15 as shown by FIG. 1. Latch 42 is used to secure first foldable member 15 and second foldable member 20 in upright position 13.

To accommodate goose neck trailers without having to lower the tailgate 10, the tailgate 10 needs to extend to a height 40 less than that of the sides of the truck bed 6. In the embodiment shown by FIG. 1, tailgate 10 is comprised of three sections. The first section 45 and third section 55 extend to a height 52 generally equal to the sides of truck bed 6. Second section 49 extends to a height 40 less than the height 52 of the first and third sections 45 and 55. Notched section 50 in the top side 51 of the plurality of foldable members 11 creates an opening where a goose neck trailer is attached to the truck 5 without having to lower tailgate 10.

In addition, tailgate 10 includes some other features. One feature is that members 15, 20, 25 and 30 are made from a metal mesh 35 to reduce wind resistance when truck 5 is being driven with tailgate 10 in an upright position 13. Another feature is that pin covers 61 and 62 are used to cover pins 54 and 56 respectively. Pin covers 61 and 62 provide aesthetics for tailgate 10 and corrosion prevention for pins 54 and 56 and springs 57 and 58. An additional feature is that gap plates 64 and 65 are attached to member 20. Since members 15 and 20 do not completely extend between the sides of truck bed 6, gap plates 64 and 65 are used to close gaps between the sides of truck bed 6 and members 15 and 20 as shown by FIG. 1.

The preferred embodiment of the invention has been shown and described, it will be apparent to those skilled in this art that various modifications may be made in the embodiment without departing from the spirit of the present invention.

Therefore, the embodiments of the invention in which an exclusive property or privilege is claimed are defined as follows:

1. A tailgate mountable to a rear end of a truck bed and convertible into a ramp between the truck bed and the ground, said tailgate comprising:

a first frame member having first and second sides, said first side of said first frame member being pivotally couplable to a rear end of said truck bed for pivotal movement relative to the truck between a substantially upstanding position and a rearwardly extending position:

a second frame member having first and second sides, said first side of said second frame member being pivotally coupled to said second side of said first frame member so that said first and second frame members are movable between a folded configuration in which said first frame member is along-side and adjacent to said second frame member and an extended configuration in which said first and second frame members are arranged end-to-end in a substantially linear orientation;

a third frame member having first and second sides, said first side of said third frame member being pivotally coupled to said second side of said second frame member so that said third frame member is movable between a folded configuration in which said third frame member is nested between said first and second frame members and at least partially within said second frame member and an extended configuration in which said third and second frame members are arranged end-to-end in a substantially linear orientation:

a fourth frame member having first and second sides, said first side of said fourth frame member being pivotally coupled to said second side of said second frame member so that said fourth frame member is movable between a folded configuration in which said fourth frame member is nested between said first and second frame members and at least partially within said second frame member and an extended configuration in which said forth and second frame members are arranged end-to-end in a substantially linear orientation:

said fourth frame member being positioned along-side said third frame member so that said third and fourth frame members independently pivot between said folded and extended configurations:

an elongate rail connected to said second side of said second frame member and positioned substantially parallel to said second side of said second frame member; and said third and fourth frame members being pivotally coupled to said rail for sliding movement across at least a majority of a length of said second side of said second frame member so that variable spacing is establishable between said third and fourth frame members.

2. The tailgate as recited in claim 1 further comprising:

at least one hinge connection between each of said third and fourth frame members and said second frame member, each of said hinge connections being configured to prevent collapse of said tailgate in said extended configuration.

3. The tailgate as recited in claim 2 further comprising:

at least one hinge connection between said first and second frame members, said hinge connection being configured to prevent collapse of said tailgate in said extended configuration so that said ramp is supportable solely at an upper end upon the bed of the truck and at a lower end upon the ground for providing a ramp therebetween.

4. The tailgate as recited in claim 3 further comprising:

at least a portion of one of said frame members being constructed from metal mesh for reducing wind drag when the truck is moving.

5. The tailgate as recited in claim 3 wherein said frame members are configured to provide a notch at a top edge of said tailgate in said folded configuration at a mid-section of said top edge for accommodating hitching of a goose neck trailer to the truck.

\* \* \* \* \*